United States Patent
Varadarajan et al.

(10) Patent No.: US 12,129,408 B2
(45) Date of Patent: Oct. 29, 2024

(54) TAPE

(71) Applicant: Berry Global, Inc., Evansville, IN (US)

(72) Inventors: Krishnaraju Varadarajan, Evansville, IN (US); Abboud L. Mamish, Marlborough, MA (US)

(73) Assignee: Berry Global, Inc., Evansville, IN (US)

( * ) Notice: Subject to any disclaimer, the term of this patent is extended or adjusted under 35 U.S.C. 154(b) by 801 days.

(21) Appl. No.: 16/919,760

(22) Filed: Jul. 2, 2020

(65) Prior Publication Data

US 2021/0002517 A1 Jan. 7, 2021

Related U.S. Application Data

(60) Provisional application No. 62/870,099, filed on Jul. 3, 2019.

(51) Int. Cl.
*C09J 7/29* (2018.01)

(52) U.S. Cl.
CPC .............. *C09J 7/29* (2018.01); *C09J 2423/00* (2013.01); *C09J 2467/00* (2013.01)

(58) Field of Classification Search
None
See application file for complete search history.

(56) References Cited

U.S. PATENT DOCUMENTS

| | | | | |
|---|---|---|---|---|
| 5,501,897 A | * | 3/1996 | Ichikawa | H01F 27/323 442/151 |
| 6,045,902 A | * | 4/2000 | Imanishi | C08J 5/18 428/338 |
| 2006/0051558 A1 | | 3/2006 | Sieber | |
| 2011/0067799 A1 | * | 3/2011 | Mussig | C09J 7/38 156/324 |
| 2012/0231167 A1 | * | 9/2012 | Langeman | C09J 7/29 156/60 |
| 2017/0348947 A1 | | 12/2017 | Cordova | |
| 2018/0009209 A1 | | 1/2018 | Pan | |
| 2019/0153268 A1 | * | 5/2019 | Fogel | B60P 7/0884 |

FOREIGN PATENT DOCUMENTS

WO 2015100319 A1 7/2015

OTHER PUBLICATIONS

"Polyester" Wikipedia, avaialble at https://en.wikipedia.org/wiki/Polyester, available at least on Sep. 2, 2020, 10 pages.
"Polyolefin" Wikipedia, available at https://en.wikipedia.org/wiki/Polyolefin, available at least on Sep. 2, 2020, 4 pages.
International (PCT) Search Report for PCT/US20/40581 dated Nov. 23, 2020, BP-537 PCT II , 12 pages.

* cited by examiner

*Primary Examiner* — Patricia L. Nordmeyer
(74) *Attorney, Agent, or Firm* — Barnes & Thornburg LLP

(57) ABSTRACT

An adhesive tape comprises an adhesive layer and a multi-layer film. The adhesive tape is configured to tear cleanly by hand so that the formed cleaved edges do not extend past a cleavage line.

12 Claims, 2 Drawing Sheets

TAPE

PRIORITY CLAIM

This application claims priority under 35 U.S.C. § 119(e) to U.S. Provisional Application No. 62/870,099, filed Jul. 3, 2019, which is expressly incorporated by reference herein.

BACKGROUND

The present disclosure relates to polymeric materials, and particularly to polymeric films. More particularly, the present disclosure relates to films for tape.

SUMMARY

According to the present disclosure, an adhesive tape includes an adhesive layer and a multi-layer film.

In illustrative embodiments, the multi-layer film comprises a first layer comprising a polyolefin and a second layer comprising a polyester.

In illustrative embodiments, the multi-layer film is configured so that when a user applies force in a cross-machine direction, a tear from a first edge of the tape to the second edge of the tape forms a first piece of torn tape and a second piece of torn tape. Illustratively, the formed edge of the first piece of torn tape does not extend over a cleavage line that is perpendicular to the first and second edges.

In illustrative embodiments, the Elmendorf Tear (CD) per mil thickness of the multi-layer film 12 is at least at least about 5 g/mil. In some embodiments, the tensile strength per mil thickness of the multi-layer film is at least about 6 lbs./mil.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figure in which.

Figure 3A:
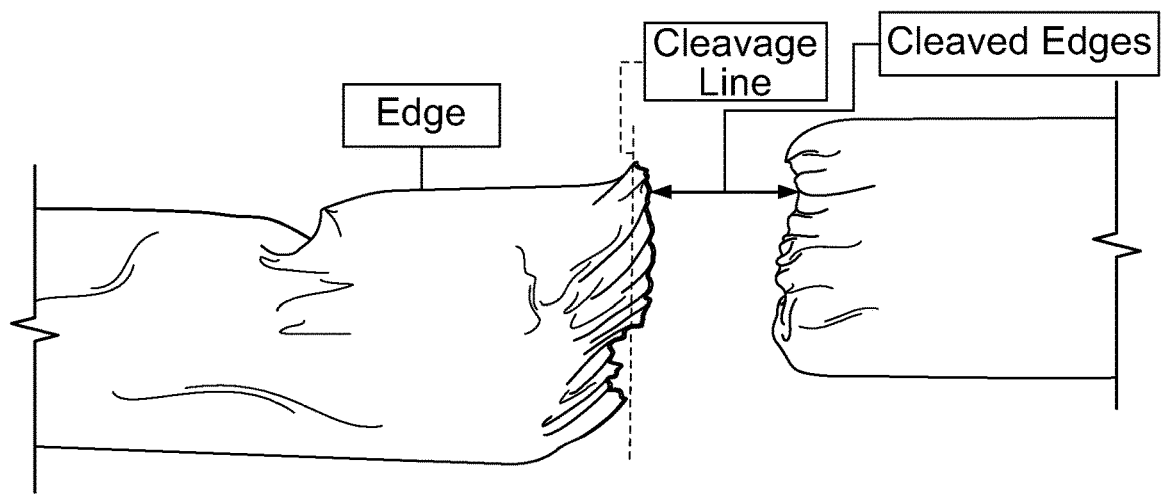
Figure 3B:
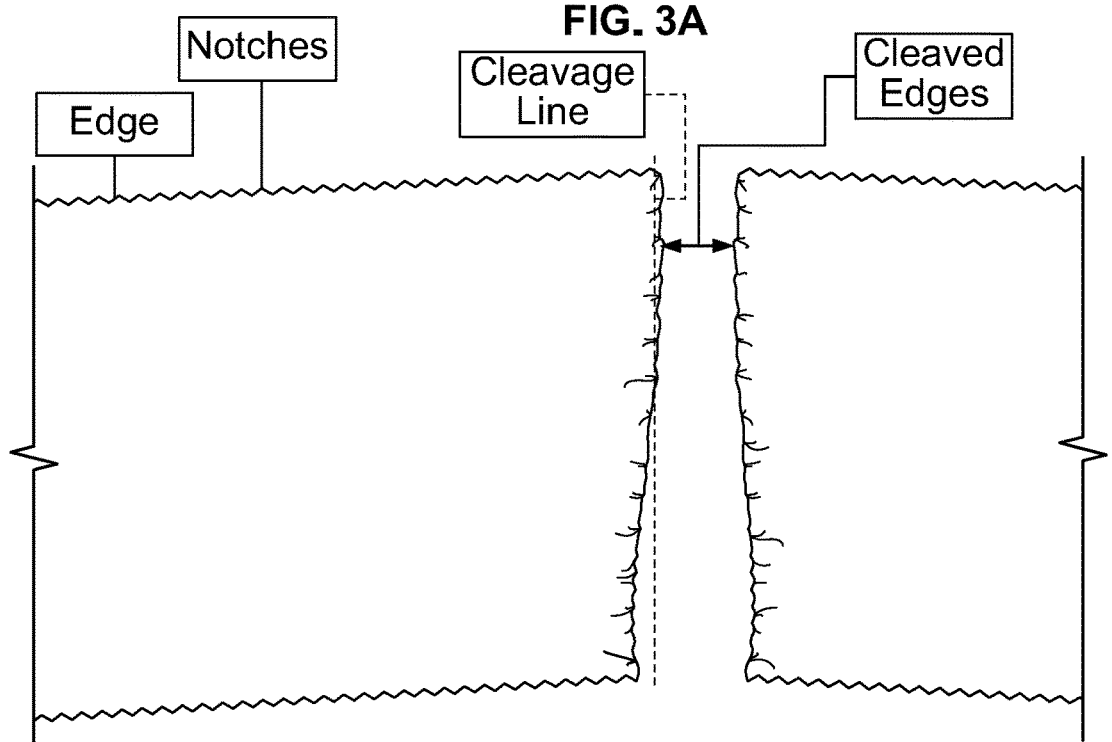
Figure 3C:
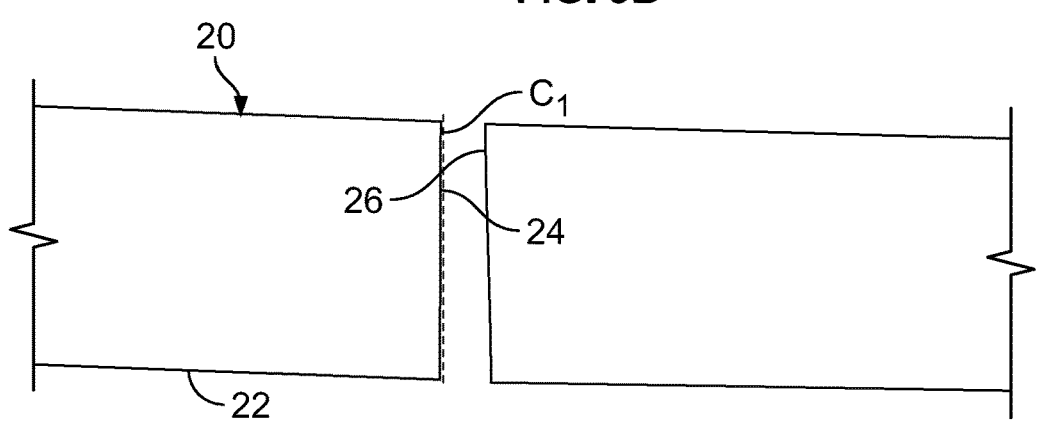

FIGS. 3A-C show a polyolefin-based tape (FIG. 3A), a polyester-based tape (FIG. 3B), and an adhesive tape according to the present disclosure (FIG. 3C), each after being torn by hand, and further showing the polyolefin-based tape exhibits stretching along a cleavage line and the polyester-based tape requiring notches for concentrating tear force.

DETAILED DESCRIPTION

Figure 1:
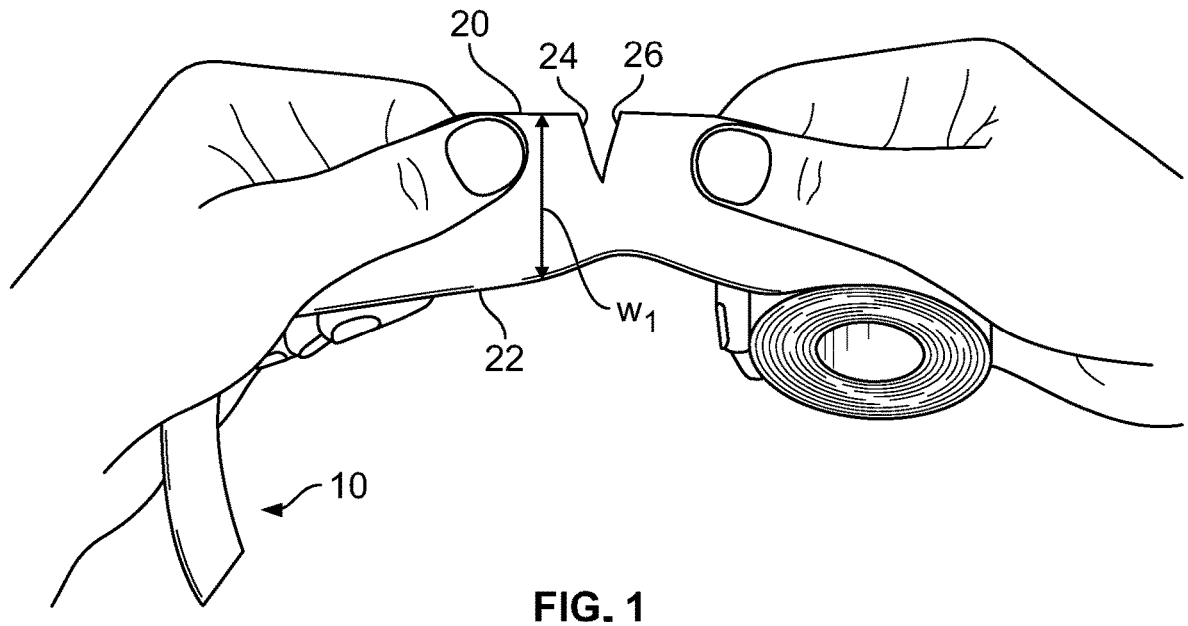
FIG. 1 is a perspective view of a user hand tearing an adhesive tape according to the present disclosure, and further showing that the adhesive tape cleanly tears in a cross-machine direction.
Figure 2:
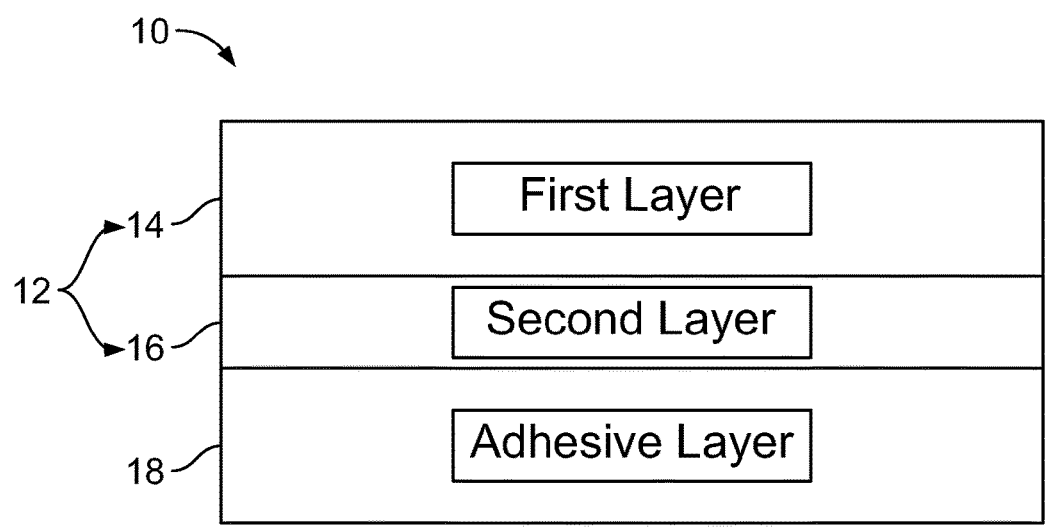
FIG. 2 is a diagram of the adhesive tape shown in FIG. 1.

Paper-based making tapes tend to not unwind in one piece due to low cohesive strength. Adhesive tape 10 comprises a multi-layer film 12 and an adhesive layer 18 directly adjacent multi-layer film 12, as shown in FIG. 2. Adhesive tape 10 has sufficient cohesive strength to provide consistent one piece removal. In addition, adhesive tape 10 is configured to tear cleanly in a cross-machine direction in response to a force provided by a user's hands, as shown in FIGS. 1 and 3C.

Illustratively, polyester films alone do not hand tear easily in the cross-machine direction. Thus, to improve tearability, polyester films may have a notch along the edge of the film to initiate and concentrate a tearing force in a cross-machine direction, as shown in FIG. 3B. In contrast, polyolefin films, such as polyethylene films, may display excessive stretching in response to a tearing force in a cross-machine direction, causing the film to not tear cleanly, as shown in FIG. 3A. Thus, to improve polyolefin film tearability, the polyolefin film may have an additional processing step such as calendaring. As described herein, combining two films, such as a polyolefin and a polyester may result in crisp hand tearability without additional process steps, as shown in FIG. 3C.

In some illustrative embodiments, multi-layer film 12 includes a first layer 14 comprising a polyolefin and a second layer 16 comprising a polyester, as shown in FIG. 2. In some embodiments, an adhesive layer 18 is directly adjacent second layer 16, as shown in FIG. 2. Multi-layer film 12 may suitably comprise, consist of, or consist essentially of first layer 14 and second layer 16.

First layer 14 comprises a polyolefin. In some embodiments, first layer 14 comprises a polyethylene, a polypropylene, or a combination thereof. Illustrative polyethylenes include homopolymers of ethylene or copolymers of ethylene. In some embodiments, first layer 14 comprises a low density polyethylene (LDPE), a linear low density polyethylene (LLDPE), a high density polyethylene (HDPE), a mixture thereof, or any suitable alternative. In some embodiments, first layer 14 comprises a blend of at least two polyolefins. In some embodiments, first layer 14 comprises a blend of LDPE and HDPE. First layer 14 may suitably comprise, consist of, or consist essentially of a polyethylene such as LDPE, LLDPE, HDPE, or a combination thereof. In some embodiments, the LDPE is Chevron Phillips MarFlex 1018.

Second layer 16 comprises a polyester. In some embodiments, second layer 16 comprises a polyester copolymer. Illustrative polyester copolymers include those formed of diacids and diols. In some embodiments, the copolymer is formed from more than one diacid, more than one diol, or more than one diacid and more than one diol. Illustrative diacids include terephthalic acid and isophthalic acid. Illustrative diols include ethylene glycol and cyclohexane dimethanol. In some embodiments, second layer 16 comprises a polyethylene terephthalate (PET). Second layer 16 may suitably comprise, consist of, or consist essentially of a polyester such as PET.

In illustrative embodiments, multi-layer film 12 is formed by extrusion coating or by lamination. In some embodiments, first layer 14 is extruded onto second layer 16. In some embodiments, first layer 14 comprises a polyethylene and second layer 16 comprises PET and first layer 14 is extruded onto second layer 16.

Multi-layer film 12 has a thickness. In some embodiments, the thickness of multi-layer film 12 is less than about 5 mils or less than about 4 mils. In some embodiments, multi-layer film 12 is about 2 mils, about 2.2 mils, about 2.4 mils, about 2.6 mils, about 2.8 mils, about 2.9 mils, about 3 mils, about 3.1 mils, about 3.2 mils, about 3.3 mils, about 3.4 mils, about 3.6 mils, about 3.8 mils, about 4 mils, about 4.2 mils, about 4.4 mils, about 4.6 mils, about 4.8 mils, or about 5 mils thick. In some embodiments, multi-layer film 12 has a thickness in a range or about 2 mils to about 5 mils, about 2 mils to about 4 mils, about 3 mils to about 4 mils, or about 3 mils to about 3.5 mils. In some embodiments, multi-layer film 12 is about 3.2 mils thick.

In illustrative embodiments, it may be advantageous for first layer 14 to have a particular thickness. In some embodiments, first layer 14 is less than about 3 mils or less than about 2.5 mils thick. In some embodiments, first layer 14 is at least about 0.5 mils or at least about 1 mil thick. In some embodiments, first layer 14 is about 0.5 mils, about 1 mil, about 1.2 mils, about 1.4 mils, about 1.6 mils, about 1.8 mils, about 2 mils, about 2.2 mils, about 2.5 mils, or about 3 mils thick. In some embodiments, first layer 14 is about 0.5 mils to about 3 mils or about 1 mil to about 2 mils thick.

In illustrative embodiments, it may be advantageous for second layer 16 to have a particular thickness. In some embodiments, second layer 16 is less than about 1 mil or less than about 0.6 mils thick. In some embodiments, second layer 16 is about 0.2 mils, about 0.4 mils, about 0.5 mils, about 0.6 mils, about 0.8 mils, or about 1 mil thick. In some embodiments, second layer 16 is about 0.2 mils to about 1 mil or about 0.2 mils to about 0.6 mils thick.

Adhesive tape 10 comprises adhesive layer 18 directly adjacent multi-layer film 12, as shown in FIG. 2. In some embodiments, adhesive layer 18 is directly adjacent first layer 14. In some embodiments, adhesive layer 18 is directly adjacent second layer 16. In some embodiments, second layer 16 extends between and interconnects adhesive layer 18 and first layer 14, as suggested in FIG. 2. Adhesive tape 10 may suitably comprise, consist of, or consist essentially of first layer 14, second layer 16, and adhesive layer 18.

In some embodiments, adhesive tape 10 comprises a primer layer between first layer 14 and second layer 16. Illustratively, the primer layer improves the bonding of first layer 14 and second layer 16. In illustrative embodiments, the primer layer is first applied to second layer 16. In illustrative embodiments, the primer layer is applied to second layer 16 when second layer 16 comprises or consists of a polyester. Illustratively, first layer 14 is extruded onto the primed surface of second layer 16. Exemplary primers used for the primer layer include Mica A-131-X primer available from the MICA™ Corporation. Adhesive tape 10 may suitably comprise, consist of, or consist essentially of first layer 14, second layer 16, a primer layer, and adhesive layer 18.

Adhesive layer 18 comprises an adhesive. In some embodiments, the adhesive is a rubber based adhesive or a hot melt adhesive. The hot melt adhesive may be based on acrylate chemistry. Illustratively, the adhesive may be selected based on the bond strength/release characteristics required for a specific application.

Adhesive tape 10 has a thickness. In some embodiments, the thickness of adhesive tape 10 is less than about 7 mils or less than about 6 mils thick. In some embodiments, adhesive tape 10 is about 3 mils, about 3.1 mils, about 3.2 mils, about 3.3 mils, about 3.4 mils, about 3.6 mils, about 3.8 mils, about 4 mils, about 4.2 mils, about 4.4 mils, about 4.6 mils, about 4.8 mils, about 4.9 mils, about 5 mils, about 5.1 mils, about 5.2 mils, about 5.3 mils, about 5.4 mils, about 5.6 mils, about 5.8 mils, about 6 mils, about 6.5 mils, or about 7 mils thick. In some embodiments, adhesive tape 10 has a thickness in a range or about 3 mils to about 7 mils, about 4 mils to about 7 mils, about 4 mils to about 6 mils, or about 4.6 mils to about 5.4 mils. In some embodiments, adhesive tape 10 is about 5.1 mils thick.

Adhesive tape 10 has a measurable adhesion to steel. An adhesion to steel value may indicate how well adhesive tape 10 would bond to a variety of substrates, such as, aluminum and other metals, concrete, paper, or wood. In some embodiments, adhesive tape 10 has an adhesion to steel less than about 90 oz., less than about 80 oz., or less than about 70 oz., as measured by PSTC-101 (Pressure Sensitive Tape Council Test). In some embodiments, the adhesion to steel for adhesive tape 10 is about 40 oz., about 42 oz., about 44 oz., about 46 oz., about 48 oz., about 50 oz., about 51 oz., about 52 oz., about 53 oz., about 54 oz., about 55 oz., about 56 oz., about 57 oz., about 58 oz., about 59 oz., about 60 oz., about 62 oz., about 64 oz., about 66 oz., about 68 oz., about 70 oz., about 75 oz., about 80 oz., or about 90 oz., as measured by PSTC-101. In some embodiments, adhesive tape 10 has an adhesion to steel in a range of about 40 oz. to about 90 oz., about 40 oz. to about 80 oz., about 40 oz. to about 70 oz., about 40 oz. to about 60 oz., about 45 oz. to about 60 oz., or about 50 oz. to about 60 oz., as measured by PSTC-101. In some embodiments, adhesive tape 10 has an adhesion to steel of about 55 oz., as measured by PSTC-101.

Adhesive tape 10 has a measurable adhesion to a backing layer. An adhesion to backing layer measurement measures how well an adhesive tape would peel from an underlying backing layer of a self-wound tape. In some embodiments, adhesive tape 10 has an adhesion to backing layer less than about 40 oz., less than about 30 oz., or less than about 25 oz., as measured by PSTC-101. In some embodiments, the adhesion to backing layer for adhesive tape 10 is about 15 oz., about 18 oz., about 20 oz., about 21 oz., about 22 oz., about 23 oz., about 24 oz., about 25 oz., about 26 oz., about 27 oz., about 28 oz., about 29 oz., about 30 oz., about 32 oz., about 34 oz., about 36 oz., about 38 oz., or about 40 oz., as measured by PSTC-101. In some embodiments, adhesive tape 10 has an adhesion to backing layer in a range of about 15 oz. to about 40 oz., about 15 oz. to about 35 oz., about 15 oz. to about 30 oz., or about 20 oz. to about 30 oz., as measured by PSTC-101. In some embodiments, adhesive tape 10 has an adhesion to backing layer of about 24 oz., as measured by PSTC-101.

Adhesive tape 10 has a measurable mass anchorage. A mass anchorage measurement indicates how well the adhesive bonds to the backing layer onto which it is coated. In some embodiments, adhesive tape 10 has a mass anchorage less than about 45 oz., less than about 40 oz., or less than about 35 oz., as measured by PSTC-101. In some embodiments, the mass anchorage for adhesive tape 10 is about 20 oz., about 22 oz., about 24 oz., about 26 oz., about 27 oz., about 28 oz., about 29 oz., about 30 oz., about 31 oz., about 32 oz., about 33 oz., about 34 oz., about 35 oz., about 36 oz., about 37 oz., about 38 oz., about 40 oz., about 42 oz., or about 45 oz., as measured by PSTC-101. In some embodiments, adhesive tape 10 has a mass anchorage in a range of about 20 oz. to about 45 oz., about 20 oz. to about 40 oz., about 25 oz. to about 40 oz., about 30 oz. to about 40 oz., or about 30 oz. to about 35 oz., as measured by PSTC-101. In some embodiments, adhesive tape 10 has a mass anchorage of about 32 oz., as measured by PSTC-101.

Adhesive tape 10 has a measurable probe tack. Probe tack measures the tackiness of the adhesive by measuring how the strength of adhesion to a probe. In some embodiments, adhesive tape 10 has a probe tack less than about 1200 g, or less than about 1150 g, as measured according to ASTM D2979. In some embodiments, the probe tack for adhesive tape 10 is about 1100 g, about 1120 g, about 1130 g, about 1140 g, about 1145 g, about 1150 g, about 1155 g, about 1160 g, about 1170 g, about 1180 g, about 1190 g, or about 1200 g, as measured according to ASTM D2979. In some embodiments, adhesive tape 10 has a probe tack in a range of about 1100 g to about 1200 g, about 1100 g to about 1800 g, about 1100 g to about 1170 g, about 1120 g to about 1170 g, about 1130 g to about 1170 g, or about 1130 g to about 1160 g, as measured according to ASTM D2979. In some embodiments, adhesive tape 10 has a probe tack of about 1150 g, as measured according to ASTM D2979.

Adhesive tape 10 has a measurable tensile strength. In some embodiments, the tensile strength of adhesive tape 10 is less than about 40 lbs., less than about 30 lbs., or less than about 25 lbs. as measured according to ASTM D882. In some embodiments, the tensile strength of adhesive tape 10 is at least 10 lbs. or at least 20 lbs. as measured according to ASTM D882. In some embodiments, the tensile strength of adhesive tape 10 is about 10 lbs., about 12 lbs., about 14 lbs., about 16 lbs., about 18 lbs., about 20 lbs., about 21 lbs., about 22 lbs., about 23 lbs., about 24 lbs., about 25 lbs., about 26 lbs., about 27 lbs., about 28 lbs., about 29 lbs., about 30 lbs., about 32 lbs., about 35 lbs., or about 40 lbs. as measured according to ASTM D882. In some embodiments, the tensile strength of adhesive tape 10 is in a range of about 10 lbs. to about 40 lbs., about 10 lbs. to about 35 lbs., about 15 lbs. to about 35 lbs., about 20 lbs. to about 35 lbs., or about 20 lbs. to about 30 lbs. as measured according to ASTM D882. In some embodiment, the tensile strength of adhesive tape 10 is about 24 lbs. as measured according to ASTM D882.

Adhesive tape 10 has a measurable percent elongation. In some embodiments, the percent elongation is less than about 120% or less than about 100% as measured according to ASTM D882. In some embodiments, the percent elongation is at least 80% or at least 90% as measured according to ASTM D882. In some embodiments, the percent elongation is about 80%, about 85%, about 90%, about 92%, about 94%, about 95%, about 96%, about 97%, about 98%, about 99%, about 100%, about 101%, about 102%, about 103%, about 104%, about 106%, about 108%, about 110%, or about 120% as measured according to ASTM D882. In some embodiments, the percent elongation of adhesive tape 10 is in a range of about 80% to about 120%, about 90% to about 120%, about 90% to about 110%, about 95% to about 110%, or about 95% to about 102% as measured according to ASTM D882. In some embodiments, the percent elongation of adhesive tape 10 is about 99% as measured according to ASTM D882.

Adhesive tape 10 has a measurable Elmendorf Tear in the machine direction (MD). In some embodiments, the Elmendorf Tear MD of adhesive tape 10 is at least about 50 g or at least about 60 g, as measured by ASTM D-1922. In some embodiments, the Elmendorf Tear MD of adhesive tape 10 is less than about 80 g or less than about 70 g, as measured by ASTM D-1922. In some embodiments, the Elmendorf Tear MD of adhesive tape 10 is about 50 g to about 80 g, about 60 g to about 80 g, or about 60 g to about 70 g, as measured by ASTM D-1922. In some embodiments, the Elmendorf Tear MD is about 68 g, as measured by ASTM D-1922.

Adhesive tape 10 has a measurable Elmendorf Tear in the cross direction (CD). In some embodiments, the Elmendorf Tear CD of adhesive tape 10 is at least about 30 g, or at least about 40 g, as measured by ASTM D-1922. In some embodiments, the Elmendorf Tear CD of adhesive tape 10 is less than about 80 g or less than about 70 g, as measured by ASTM D-1922. In some embodiments, the Elmendorf Tear CD of adhesive tape 10 is about 30 g, about 35 g, about 40 g, about 45 g, about 50 g, about 52 g, about 54 g, about 56 g, about 57 g, about 58 g, about 59 g, about 60 g, about 61 g, about 62 g, about 63 g, about 64 g, about 66 g, about 68 g, about 69 g, about 70 g, about 75 g, or about 80 g, as measured by ASTM D-1922. In some embodiments, adhesive tape 10 has an Elmendorf Tear CD in a range of about 30 g to about 80 g, about 40 g to about 80 g, about 50 g to about 80 g, about 50 g to about 70 g, or about 56 g to about 70 g, as measured by ASTM D-1922. In some embodiments, the Elmendorf Tear CD of adhesive tape 10 is about 60 g.

Adhesive tape 10 has a measurable high speed unwind. In some embodiments, the high speed unwind of adhesive tape 10 is in a rage of about 15 g to about 25 g as measured by ASTM D1000 or PSTC-13.

Adhesive tape 10 has a measurable instron unwind. In some embodiments, the instron unwind of adhesive tape 10 is in a rage of about 30 g to about 40 g as measured by ASTM D1000 or PSTC-13.

Adhesive tape 10 has a particular tensile strength per mil thickness of multi-layer film 12. In some embodiments, the tensile strength per mil thickness of multi-layer film 12 is at least about 5 lbs./mil or at least about 6 lbs./mil. In some embodiments, the tensile strength per mil thickness of multi-layer film 12 is about 5.5 lbs./mil, about 6 lbs./mil, about 6.5 lbs./mil, about 7 lbs./mil, about 7.1 lbs./mil, about 7.2 lbs./mil, about 7.3 lbs./mil, about 7.4 lbs./mil, about 7.5 lbs./mil, about 7.6 lbs./mil, about 7.7 lbs./mil, about 7.8 lbs./mil, about 7.9 lbs./mil, about 8 lbs./mil, or about 8.5 lbs./mil. In some embodiments, the tensile strength per mil thickness of multi-layer film 12 is in a range of about 5 lbs./mil to about 8.5 lbs./mil, about 5.5 lbs./mil to about 8.5 lbs./mil, about 6 lbs./mil to about 8.5 lbs./mil, or about 6.5 lbs./mil to about 8 lbs./mil.

Adhesive tape 10 has a particular percent elongation per mil thickness of multi-layer film 12. In some embodiments, the percent elongation per mil thickness of multi-layer film 12 is at least at least 15%/mil, at least about 20%/mil, or at least about 25%/mil. In some embodiments, the percent elongation per mil thickness of multi-layer film 12 is about 15%/mil, about 20%/mil, about 25%/mil, about 26%/mil, about 27%/mil, about 28%/mil, about 29%/mil, about 30%/mil, about 31%/mil, about 32%/mil, about 33%/mil, about 34%/mil, about 35%/mil, or about 40%/mil. In some embodiments, the percent elongation per mil thickness of multi-layer film 12 is in a range of about 15%/mil to about 40%/mil, about 20%/mil to about 40%/mil, about 25%/mil to about 40%/mil, or about 25%/mil to about 35%/mil.

Adhesive tape 10 has a particular Elmendorf Tear (MD) per mil thickness of multi-layer film 12. In some embodiments, the Elmendorf Tear (MD) per mil thickness of multi-layer film 12 is at least at least about 13 g/mil, at least about 16 g/mil, or at least about 20 g/mil. In some embodiments, the Elmendorf Tear (MD) per mil thickness of multi-layer film 12 is about 14 g/mil, about 15 g/mil, about 16 g/mil, about 17 g/mil, about 18 g/mil, about 19 g/mil, about 20 g/mil, about 21 g/mil, about 22 g/mil, about 23 g/mil, about 25 g/mil, or about 30 g/mil. In some embodiments, the Elmendorf Tear (MD) per mil thickness of multi-layer film 12 is in a range of about 14 g/mil to about 30 g/mil, about 14 g/mil to about 25 g/mil, about 16 g/mil to about 25 g/mil, or about 18 g/mil to about 25 g/mil.

Adhesive tape 10 has a particular Elmendorf Tear (CD) per mil thickness of multi-layer film 12. In some embodiments, the Elmendorf Tear (CD) per mil thickness of multi-layer film 12 is at least at least about 5 g/mil, at least about 10 g/mil, or at least about 16 g/mil. In some embodiments, the Elmendorf Tear (CD) per mil thickness of multi-layer film 12 is about 5 g/mil, about 10 g/mil, about 12 g/mil, about 14 g/mil, about 15 g/mil, about 16 g/mil, about 17 g/mil, about 18 g/mil, about 19 g/mil, about 20 g/mil, about 21 g/mil, about 22 g/mil, about 23 g/mil, about 25 g/mil, or about 30 g/mil. In some embodiments, the Elmendorf Tear (CD) per mil thickness of multi-layer film 12 is in a range of about 5 g/mil to about 30 g/mil, about 10 g/mil to about 30 g/mil, about 10 g/mil to about 25 g/mil, or about 14 g/mil to about 25 g/mil.

A user may tear adhesive tape 10 by hand, as shown in FIG. 1. In some embodiments, adhesive tape 10 comprises a first edge 20, a second edge 22 generally parallel to first edge 20, and width W1 generally perpendicular to first edge 20 and second edge 22, as shown in FIG. 1. Illustratively, the cross-machine direction corresponds to the width W1 of adhesive tape 10, as suggested in FIG. 1.

A user may apply by hand a force to adhesive tape 10 in a cross-machine direction, as shown in FIG. 1. Such a force may form a cleaved edge 24 of a first piece of torn tape and a cleaved edge 26 of a second piece of torn tape, as shown in FIGS. 1 and 3A-C. Illustratively, the force applied by the user propagates a tear from first edge 20 to second edge 22 along cleavage line C1, as shown in FIG. 3C, to form a first piece of torn tape and a second piece of torn tape. Illustratively, cleavage line C1 is perpendicular to edges 20, 22.

In some embodiments, multi-layer film 12 is configured so that stretching of adhesive tape 10 is minimized. Illustratively, minimizing the stretching may result in a clean tear in the cross-machine direction. As described herein, multi-layer film 12 is configured so that cleaved edges 24, 26 of the pieces of torn tape are generally mirror images of one another. As an example, formed cleaved edges 24 and 26 may be close to parallel with one another. Illustratively, no portion of cleaved edges 24, 26 extend over cleavage line C1, as shown in FIG. 3C. After tearing a polyolefin-based tape or a polyester-based tape, portions of the cleaved edges extend over the cleavage line, as shown in FIGS. 3A, B.

Performance characteristics of film tapes and paper masking tapes are tensile strength, percent elongation at failure, and peel strength, with peel strength being tailored to the specific application of the tape. For masking tapes, the peel strength needs to be low and the adhesive should not leave a residue upon tape removal. Tensile strength, elongation at failure and hand tearability need to be designed in the tape backing. It is very difficult to match the performance of the paper backing in a film structure. The combination of PET film/PE film either as an adhesive lamination or an extrusion lamination or just an extrusion coated PE on a PET film would provide this paper like performance.

In some embodiments, multi-layered film 12 provides clean cross hand tearability, as shown in FIG. 3C. Illustratively, PET-alone films do not hand tear in the cross-machine direction easily without a notch. PE-alone films may hand tear in the cross-machine direction though not cleanly due to excessive stretching. In some embodiments, combining two films, such as a polyolefin and a polyester (e.g., (PET/PE)) via extrusion coating, or lamination may result in crisp hand tearability. Illustratively, in some embodiments when the PET and PE are laminated together, they hand tear easily in the cross-machine direction with or without a notch. Furthermore, the polyester (e.g., PET) provides enhanced tensile strength to the combined structure. The combination of the two films yields balanced tensile strength and elongation that is essential for clean hand tearing.

The following numbered clauses include embodiments that are contemplated and non-limiting:

Clause 1. An adhesive tape comprising a multi-layer film.

Clause 2. The adhesive tape of clause 1, any other suitable clause, or any combination of suitable clauses, wherein the multi-layer film comprises a first layer comprising a polyolefin.

Clause 3. The adhesive tape of clause 2, any other suitable clause, or any combination of suitable clauses, wherein the multi-layer film further comprises a second layer comprising a polyester.

Clause 4. The adhesive tape of clause 3, any other suitable clause, or any combination of suitable clauses, wherein the adhesive tape is configured to minimize deformation in response to a forced applied by a user so that the tape tears cleanly in a cross-machine direction.

Clause 5. The adhesive tape of clause 3, any other suitable clause, or any combination of suitable clauses, wherein the adhesive tape is configured to minimize deformation in response to a forced applied by a user so that the tape tears cleanly.

Clause 7. The adhesive tape of clause 4, any other suitable clause, or any combination of suitable clauses, wherein the polyolefin is a polyethylene.

Clause 8. The adhesive tape of clause 7, any other suitable clause, or any combination of suitable clauses, wherein the polyester is a polyester terephthalate.

Clause 9. The adhesive tape of clause 8, any other suitable clause, or any combination of suitable clauses, any other suitable clause, or any combination of suitable clauses, wherein the adhesive tape includes an adhesive layer directly adjacent the multi-layer film.

Clause 10. The adhesive tape of clause 9, any other suitable clause, or any combination of suitable clauses, wherein the adhesive layer is directly adjacent the second layer of the multi-layer film.

Clause 11. The adhesive tape of clause 8, any other suitable clause, or any combination of suitable clauses, wherein the tensile strength per mil thickness of the multi-layer film is at least about 6 lbs./mil.

Clause 12. The adhesive tape of clause 8, any other suitable clause, or any combination of suitable clauses, wherein percent elongation per mil thickness of the multi-layer film is at least at least 15%/mil.

Clause 13. The adhesive tape of clause 8, any other suitable clause, or any combination of suitable clauses, wherein the Elmendorf Tear (MD) per mil thickness of the multi-layer film is at least at least about 13 g/mil.

Clause 14. The adhesive tape of clause 8, any other suitable clause, or any combination of suitable clauses, wherein the Elmendorf Tear (CD) per mil thickness of the multi-layer film is at least at least about 5 g/mil.

Clause 15. The adhesive tape of clause 4, any other suitable clause, or any combination of suitable clauses, wherein the multi-layer film is not calendered.

Clause 16. The adhesive tape of clause 4, any other suitable clause, or any combination of suitable clauses, wherein the adhesive tape is substantially free of serrations.

Clause 17. A method of a user tearing an adhesive tape by hand, the method comprising the user applying by hand a force to an adhesive tape to form a cleaved edge of a first piece of torn tape and a cleaved edge of a second piece of torn tape.

Clause 18. A method of a user tearing an adhesive tape by hand, the method comprising the user applying by hand a force to an adhesive tape to form an edge of a first piece of torn tape and an edge of a second piece of torn tape.

Clause 19. The method of clause 17, any other suitable clause, or any combination of suitable clauses, wherein the hand-tearable tape has a first edge, a second edge generally parallel to the first edge, and a width generally perpendicular to the first and second edges.

Clause 20. The method of clause 19, any other suitable clause, or any combination of suitable clauses, wherein the forced applied by the user propagates a tear from the first edge of the tape to the second edge of the tape to form the first piece of torn tape and the second piece of torn tape.

Clause 21. The method of clause 20, any other suitable clause, or any combination of suitable clauses, wherein the cleaved edge of the first piece of torn tape does not extend over a cleavage line that is perpendicular to the first and second edges.

Clause 22. The method of clause 21, any other suitable clause, or any combination of suitable clauses, wherein the adhesive tape comprises a multi-layer film.

Clause 23. The method of clause 22, any other suitable clause, or any combination of suitable clauses, wherein the multi-layer film comprises a first layer comprising a polyolefin.

Clause 24. The method of clause 23, any other suitable clause, or any combination of suitable clauses, wherein the multi-layer film further comprises a second layer comprising a polyester.

Clause 25. The method of clause 24, any other suitable clause, or any combination of suitable clauses, wherein the polyolefin is a polyethylene.

Clause 26. The method of clause 25, any other suitable clause, or any combination of suitable clauses, wherein the polyester is a polyester terephthalate.

Clause 27. The method of clause 26, any other suitable clause, or any combination of suitable clauses, wherein the adhesive tape includes an adhesive layer directly adjacent the multi-layer film.

Clause 28. The method of clause 27, any other suitable clause, or any combination of suitable clauses, wherein the adhesive layer is directly adjacent the second layer of the multi-layer film.

Clause 29. The method of clause 26, any other suitable clause, or any combination of suitable clauses, wherein the tensile strength per mil thickness of the multi-layer film is at least about 6 lbs./mil.

Clause 30. The method of clause 26, any other suitable clause, or any combination of suitable clauses, wherein percent elongation per mil thickness of the multi-layer film is at least at least 15%/mil.

Clause 31. The method of clause 26, any other suitable clause, or any combination of suitable clauses, wherein the Elmendorf Tear (MD) per mil thickness of the multi-layer film is at least at least about 13 g/mil Clause 32. The method of clause 31, any other suitable clause, or any combination of suitable clauses, wherein the multi-layer film is not calendered.

Clause 33. The method of clause 32, any other suitable clause, or any combination of suitable clauses, wherein the adhesive tape is substantially free of serrations.

The following examples and representative procedures illustrate features in accordance with the present disclosure, and are provided solely by way of illustration. They are not intended to limit the scope of the appended claims or their equivalents.

EXAMPLES

Adhesive Tape

A multi-layer film comprising a polyolefin layer and a polyester layer was prepared by extrusion lamination. A roll of 48 Ga PET polyester film 2261N from Mitsubishi was unwound and a coating of a primer layer was applied on a surface of the PET film. The primer layer was Mica A-131-X primer.

An LDPE layer (Chevron Phillips MarFlex 1018) was extruded onto the primed PET surface. The LDPE had a density of about 0.918 g/cm$^3$. The LDPE layer was about 2 mils thick.

An adhesive layer was applied to the PET layer of the multi-layer film to form the adhesive tape. The adhesive tape has the properties described in Table 1.

TABLE 1

Tape Properties.

| Property | Average | Standard Deviation |
|---|---|---|
| Tot. Thickness (mils) | 5.1 | 0.4 |
| Backing Thickness (mils) | 3.2 | 0.1 |
| Mass Thickness (mils) | 1.9 | 0.4 |
| Adhesion to Steel (Oz.) | 55 | 3.8 |
| Adhesion to Backing (Oz.) | 24.2 | 1.1 |
| Mass Anchorage (Oz.) | 32 | 2.3 |
| Probe Tack (g.) | 1149 | 247 |
| Tensile Strength (lbs.) | 24.1 | 1.2 |
| Elongation (%) | 99 | 14.3 |
| Elmendorf Tear-MD (g.) | 68 | 10.7 |
| Elmendorf Tear-CD (g.) | 60 | 10.3 |
| Instron Unwind (g.) | 39 | 2.2 |
| High Speed Unwind (g.) | 19 | 7.1 |

The invention claimed is:

1. An adhesive tape comprising a multi-layer film, the multi-layer film comprising
   a first layer comprising a polyolefin, and
   a second layer comprising a polyester,
   wherein the adhesive tape is configured to minimize deformation in response to a force applied by a user so that the tape tears cleanly in a cross-machine direction,
   wherein the adhesive tape includes an adhesive layer directly adjacent the multi-layer film,
   wherein the tensile strength per mil thickness of the multi-layer film is at least 6 lbs./mil, and
   wherein a thickness of the adhesive layer is larger than a thickness of one or more of the first layer or the second layer.

2. The adhesive tape of claim 1, wherein the polyolefin is a polyethylene.

3. The adhesive tape of claim 2, wherein the polyester is a polyethylene terephthalate.

4. The adhesive tape of claim 3, wherein percent elongation per mil thickness of the multi-layer film is at least 15%/mil.

5. The adhesive tape of claim 3, wherein the Elmendorf Tear (MD) per mil thickness of the multi-layer film is at least 13 g/mil.

6. The adhesive tape of claim 3, wherein the Elmendorf Tear (CD) per mil thickness of the multi-layer film is at least 5 g/mil.

7. The adhesive tape of claim 1, wherein the adhesive layer is directly adjacent the second layer of the multi-layer film.

8. The adhesive tape of claim 1, wherein the multi-layer film is not calendered.

9. The adhesive tape of claim 1, wherein the adhesive tape is free of serrations.

10. The adhesive tape of claim 1, wherein the thickness of the adhesive layer is about 1.9 mils.

11. The adhesive tape of claim 1, further comprising a primer layer disposed between the first layer and the second layer.

12. An adhesive tape comprising a multi-layer film, the multi-layer film comprising:
   a first layer comprising a polyolefin, and
   a second layer comprising a polyester,
   an adhesive layer directly adjacent the multi-layer film;
   wherein the adhesive tape is configured to minimize deformation in response to a force applied by a user so that the tape tears cleanly in a cross-machine direction, and
   wherein a thickness of the adhesive tape is 4 mils to 7 mils, and
   wherein the tensile strength per mil thickness of the multi-layer film is at least 6 lbs./mil.

* * * * *